United States Patent [19]
Poon et al.

[11] Patent Number: 5,297,115
[45] Date of Patent: Mar. 22, 1994

[54] DETECTION OF SAVED SECTORS ON AN OPTICAL DISK

[75] Inventors: Simon Y. Poon, Pleasanton; Zeljko Markovic, Hayward; Charles B. Abate, San Jose, all of Calif.

[73] Assignee: Maxoptix Corporation, San Jose, Calif.

[21] Appl. No.: 922,211

[22] Filed: Jul. 30, 1992

[51] Int. Cl.$^5$ .............................................. G11B 7/00
[52] U.S. Cl. ...................................... 369/47; 369/54; 369/58
[58] Field of Search ................................... 369/47–50, 369/54, 58, 59, 124

[56] References Cited
U.S. PATENT DOCUMENTS

5,023,854  6/1991  Satoh et al. ...................... 369/58 X
5,200,944  4/1993  Souma ................................. 369/48

Primary Examiner—W. R. Young
Attorney, Agent, or Firm—Blakely, Sokoloff, Taylor & Zafman

[57] ABSTRACT

In an optical disk drive system, an apparatus and method for determining whether data read from a particular field within a particular sector of an optical disk corresponds to a code which specifies that the sector should not be erased. A crystal clock generates a synthesized clock signal. A front-end detector generates a signal synchronized to the synthesized clock signal which represents data read from the field. The signal is then serially shifted by a serial shift register. A comparator compares the shifted signal with the code specifying that the sector should not be erased. If there is a match, a counter is incremented. When the counter reaches or exceeds a pre-determined number, a signal is sent to the optical disk drive system indicating that the sector contains data which should not be erased.

15 Claims, 5 Drawing Sheets

DETECTION OF SAVED SECTORS ON AN OPTICAL DISK

FIELD OF THE INVENTION

The present invention pertains to the field of optical disk drives. More particularly, the present invention relates to the detection of sectors on an optical disk which contain saved data, in order to ensure that the saved data is not erased.

BACKGROUND OF THE INVENTION

The commercial success of optical disk drive systems is due in part to their high storage density, relatively low cost, and random access capability. In the past, high density optical disk drive systems were limited to write-once products. That is, data was written once onto the optical disk and saved thereon. The data could be read many times but could not be erased nor subsequently overwritten with new data. This came to be known as Write-Once-Read-Many (WORM) technology.

In order to increase the flexibility and commercial appeal of WORM optical disk drive systems, methods were developed that allowed optical disks to be erased and new data written in place of the erased sections. This allowed an optical disk to be repeatedly written to and erased many times over. One such method is known as magneto-optical recording.

However, one problem with erasable optical disk drives is that, on occasion, users of optical disk drive systems desire to store certain data such as documents or records on a permanent basis. Consequently, a method is needed to indicate which sections of data stored on the optical disk are forbidden to be erased, overwritten, or otherwise altered. One such method is known as Continual Composite WORM (CCW).

CCW specifies one method for discriminating between permanent and non-permanent data on an optical disk drive system. Typically, data is represented as a series of digital bits. A lens assembly focuses a light beam which is used to read and write these bits off and onto a circular optical disk. The circular disk is rotated about a spindle. A servo mechanism is used to locate the light beam in reference to fixed radial locations over the disk surface, thereby repositioning the light beam among numerous radial positions. Thus, as the servo mechanism sequentially moves the light beam radially across the spinning optical disk, a number of concentric spiral grooves known as "tracks" are described on the optical disk. Binary bits of information are stored on the surfaces of these tracks.

Each track is subdivided into a number of different sectors with each sector being further broken into a number of fields. Often, a header field indicates the start of a sector. The header field is followed by a gap and a data field. The user's data is stored within a sector's data field. The data field also contains a Defect Management Pointer (DMP) field which is normally used for defect skipping. In other words, if the next sector is defective, the DMP field instructs the optical disk drive system to skip over that defective sector.

However, the CCW format utilizes the DMP field in a different manner. Instead of defect skipping, the DMP field is used to indicate whether that particular sector contains permanent data. If permanent data is being stored on that sector, a series of 12-14 bytes of "FF" in hexadecimal format (i.e., 1111 1111) is written to the DMP field. Thus, before any data on the optical disk is erased, overwritten, or otherwise altered, the DMP field of the sector containing that data is read to determine whether it contains 12-14 bytes of "FF".

If the DMP field of that sector contains 12-14 bytes of "FF" code, this signifies that data which the user wishes to be permanently stored is being stored on that sector. Consequently, the disk drive system knows not to erase, overwrite, or alter that sector. The disk drive system will then choose another sector and repeat the above-described process (i.e., read its DMP field to determine whether that sector contains permanent data). Eventually, the disk drive system will find an empty sector or a sector containing data which can be erased. The new data will then be written to that sector. If no such sector exists on the optical disk, the disk drive system will so indicate to the computer system that the optical disk is full of permanent data. Thus, for a CCW format to operate properly, the disk drive system should have the capability to detect the occurrence of 12-14 bytes of "FF" code in the DMP field.

One prior art method for detecting an "FF" code is to implement a high frequency counter to count the duration of the time interval between input pulses. This is used to drive a state machine for making the comparison with the "FF" code. However, one disadvantage of this method is that the count could be inaccurate due to asynchronous input pulses. Another disadvantage with this method is that the resolution of the timing between input pulses is proportional to the clock frequency. Consequently, the clock rate needs to be set at least twice the data rate. Furthermore, this method calls for tight timing requirements (e.g. for resetting input pulse latches, etc.).

Another prior art method for detecting an "FF" code is to implement a phase-lock-loop (PLL). However, one disadvantage with implementing a PLL is that under certain situations wherein a sector has been destroyed or is defective or if a sector is blank, the PLL will not operate correctly. The reason why a PLL will not work under those conditions is because a PLL requires some form of leading data in order to synchronize its circuits. Without such leading data, a PLL does not know the location to begin checking for the "FF" code.

Thus, what is needed is a fast, efficient, and accurate method for detecting an "FF" code on an optical disk without utilizing a high frequency counter nor a PLL.

SUMMARY AND OBJECTS OF THE INVENTION

In view of the problems associated with writing data onto an optical disk which might contain data which the user wishes to store on a permanent basis, one object of the present invention is to provide an accurate, efficient, and fast method for detecting whether a sector contains data which is to be stored on a permanent basis.

Another object of the present invention is to detect an "FF" code.

Yet another object of the present invention is to implement an apparatus for detecting an "FF" code without utilizing a phase-lock-loop.

Yet another object of the present invention is to utilize a series of flip-flops to generate a signal which represents the data read from the optical disk and which is also synchronous to a synthesized clock signal.

These and other objects of the present invention are provided in an optical disk drive system having an apparatus and method for determining whether data read from a particular field within a particular sector of an optical disk corresponds to a code. The code specifies that the sector is not to be erased. A crystal clock generates a synthesized clock signal. A front-end detector utilizes a number of D flip-flops to generate a signal which represents data read from the field. This signal is synchronized to the synthesized clock signal. The signal is then serially shifted by a serial shift register. A comparator compares the shifted signal with the code specifying that the sector is not to be erased. If there is a match, a counter is incremented. When the counter reaches or exceeds a pre-determined number, a signal is sent to the optical disk drive system, indicating that the sector contains data which should not be erased.

In the currently preferred embodiment of the present invention, two read channels are implemented. The two read channels are offset by a half clock cycle to ensure that input pulses read from the optical disk are detected.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

An apparatus and method for detecting an "FF" code on an optical disk indicating that a particular sector contains data which the user wishes to store on a permanent basis, without utilizing a phase-lock-loop, is described. In the following description, for the purposes of explanation, numerous specific details such as circuit diagrams and timing diagrams are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Typically, data is written and stored onto an optical disk according to a standard encoding scheme. An encoding scheme is implemented in order to physically distinguish between each data bit stored on the optical disk. A widely used encoding scheme is known as 2,7 encoding. The 2,7 encoding scheme specifies the required transitions between the data bits. In between every "1", there must be at least two "0's". There can be up to seven "0's" in between every "1". In the currently preferred embodiment, three "0's" are written in between each "1". Hence, a hexadecimal "F" which equals 1111 in binary, is physically written to and read from the optical disk as 10001000. In essence, a pair of "11" data bits is physically stored onto the optical disk as "1000." Thus, the currently preferred embodiment of the present invention detects and counts each time a 1000100010001000 ("FF") code is read off the DMP field on the optical disk. If 12-14 bytes of "FF" code are detected in the DMP field, a signal is generated which informs the optical disk drive that the corresponding sector contains data which the user wishes to store permanently. Consequently, the optical disk drive recognizes that particular sector is not to be erased.

Figure 1:
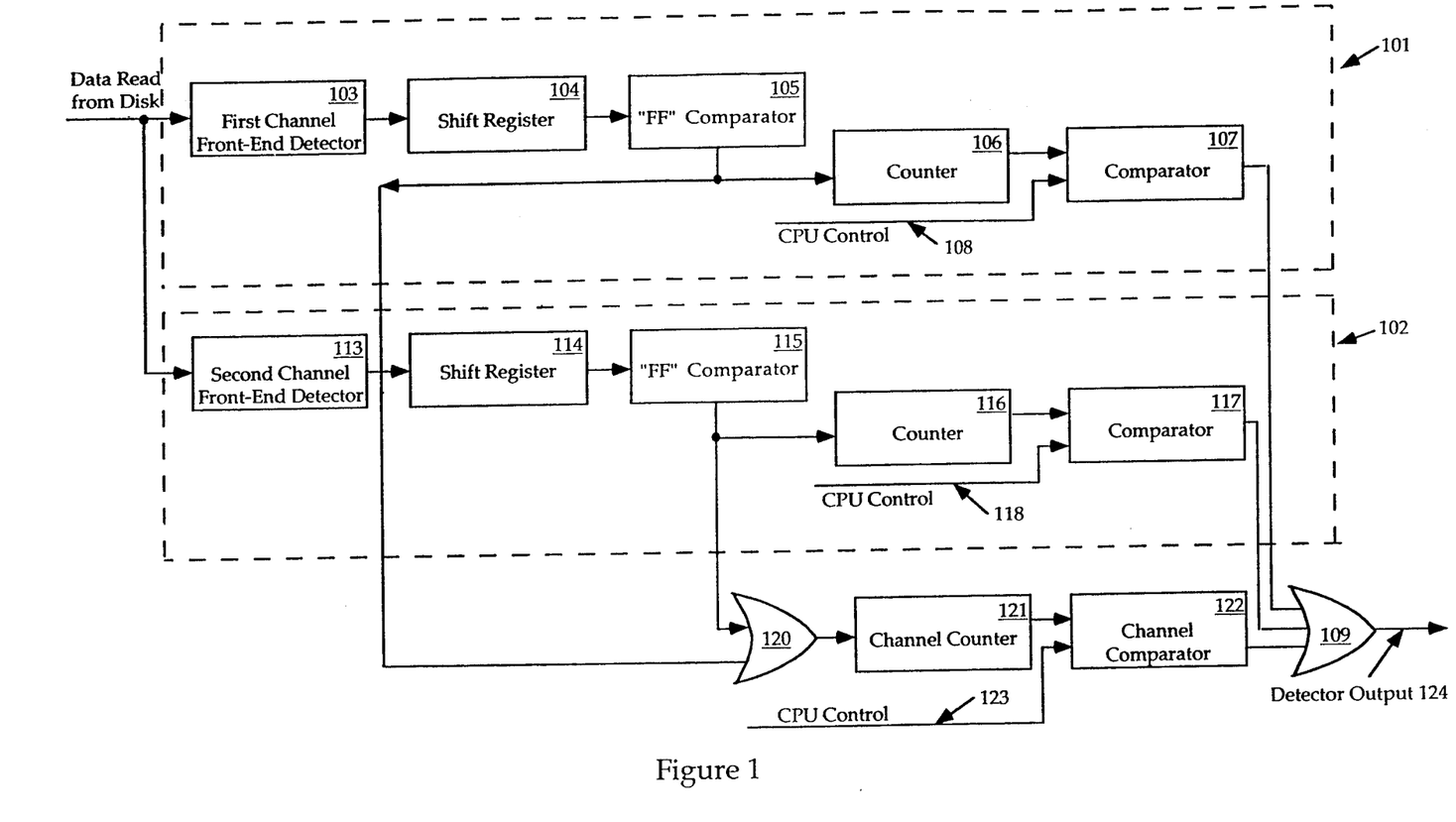
FIG. 1 is a block diagram illustrating the currently preferred embodiment of the present invention.

FIG. 1 is a block diagram illustrating the present invention. Two read channels 101 and 102 are implemented. Channel 101 operates on the positive edge of a clock pulse. Channel 102 operates on the negative edge of the clock pulse. In other words, the two read channels 101 and 102 are offset by half of a clock cycle. The reason why two read channels are implemented is to ensure detection of any input pulses read from the optical disk, regardless of when it might occur. For instance, if just one channel were implemented and an input pulse occurs near a clock edge, the pulse might be missed due to set-up time requirements. By implementing a second channel with an offset of half a clock cycle, the pulse is detected by the second channel. Since the input pulse typically has a tolerance of plus-or-minus 0.1 percent, it is guaranteed to be detected by one of the two channels.

Channel 101 is comprised of a first channel front-end detector 103 which generates a signal representing the data read from the optical disk. The signal generated by the front-end detector 103 is also synchronized to a synthesized clock signal. This synchronized signal is then sent to shift register 104 which shifts the received signal, thereby converting it so that sixteen bits are output to "FF" comparator 105. "FF" comparator 105 compares the sixteen bits received from shift register 104 to a fixed code of 1000100010001000 (i.e., the code corresponding to a hexadecimal "FF"). If there is a match between the input data pulses with the fixed code, counter 106 is incremented by one. As a result, counter 106 contains the number of "FF's" detected by channel 101. Counter 106 is coupled to comparator 107 which compares the number of "FF's" in counter 106 with a number supplied by CPU control line 108. In the currently preferred embodiment, this number is 4 (i.e., 4 bytes of "FF"). Note that this number can be programmed by the CPU. If the number of "FF's" in counter 106 equals or exceeds the number supplied by CPU control line 108, comparator 107 generates a "high" signal to OR gate 109, thereby indicating that the sector contains permanently stored data.

Similarly, channel 102 is comprised of a second channel front-end detector 113, shift register 114, "FF" comparator 115, counter 116, comparator 117, and CPU control line 118. Channel 102 operates in essentially the same manner as channel 101, except that channel 102 is offset by half a synthesized clock cycle in reference to channel 101. This offset is effectuated in the second channel front-end detector 113, which is discussed in greater detail below. The second channel front-end detector 113 detects pulses read from the optical disk in reference to negative clock edges.

The detected pulses are then sent to shift register 114 which shifts the input pulses so that sixteen bits are output to "FF" comparator 115. "FF" comparator 105 compares these sixteen bits to a fixed code of 1000100010001000. If there is a match, counter 116 is incremented by one. Consequently, counter 116 contains the number of "FF's" detected by channel 102. Counter 116 is coupled to comparator 117 which compares the number of "FF's" in counter 116 with a number supplied by CPU control line 118. If the number of "FF's" in counter 116 equals or exceeds the number supplied by CPU control line 118, comparator 117 generates a "high" signal to OR gate 109, thereby indicating that the sector contains permanently stored data.

The outputs of the two "FF" comparators 105 and 115 are also coupled to OR gate 120. The output of OR gate 120 is coupled to channel counter 121. Hence, OR gate 120 sends a signal to channel counter 121 each time an "FF" is detected by either of the two channels 101 or 102. Channel counter 121 is incremented by one each time it receives a signal from OR gate 120. If both channels 101 and 102 detect the same "FF" pattern, counter 121 is only incremented by one. Thereby, channel counter 121 counts the number of times an "FF" is detected by either of the two channels 101 and 102. Channel counter 121 sends this number to channel comparator 122 which compares it with a number as specified on CPU control line 123. If the number of times an "FF" is detected by either of the two channels 101 and 102, as indicated by channel counter 121, equals or exceeds the number specified by CPU control line 123, channel comparator 122 sends a "high" signal to OR gate 109.

The reason why OR gate 120, channel counter 121, and channel comparator 122 are required is to account for speed tolerances. The spindle motor which spins the optical disk might have a slightly mismatched speed from that of the phase-lock-loop on the servo channel. This might cause a portion of the "FF" code to be read by one channel, while the remaining portion is read by the other channel. Hence, OR gate 120 essentially adds together the number of "FF's" detected by either of the two channels 101 and 102.

OR gate 109 generates an output signal on line 124 whenever it receives a signal from either comparator 107, comparator 117, or channel comparator 122. In other words, a detector output signal 124 is generated by the present invention whenever 1) channel 101 detects the appropriate number of "FF" bytes, 2) channel 102 detects the appropriate number of "FF" bytes, or 3) the combination of channels 101 and 102 detects the appropriate number of "FF" bytes. A signal on detector output line 124 indicates that the sector contains permanently stored data and is not to be erased.

Figure 2:
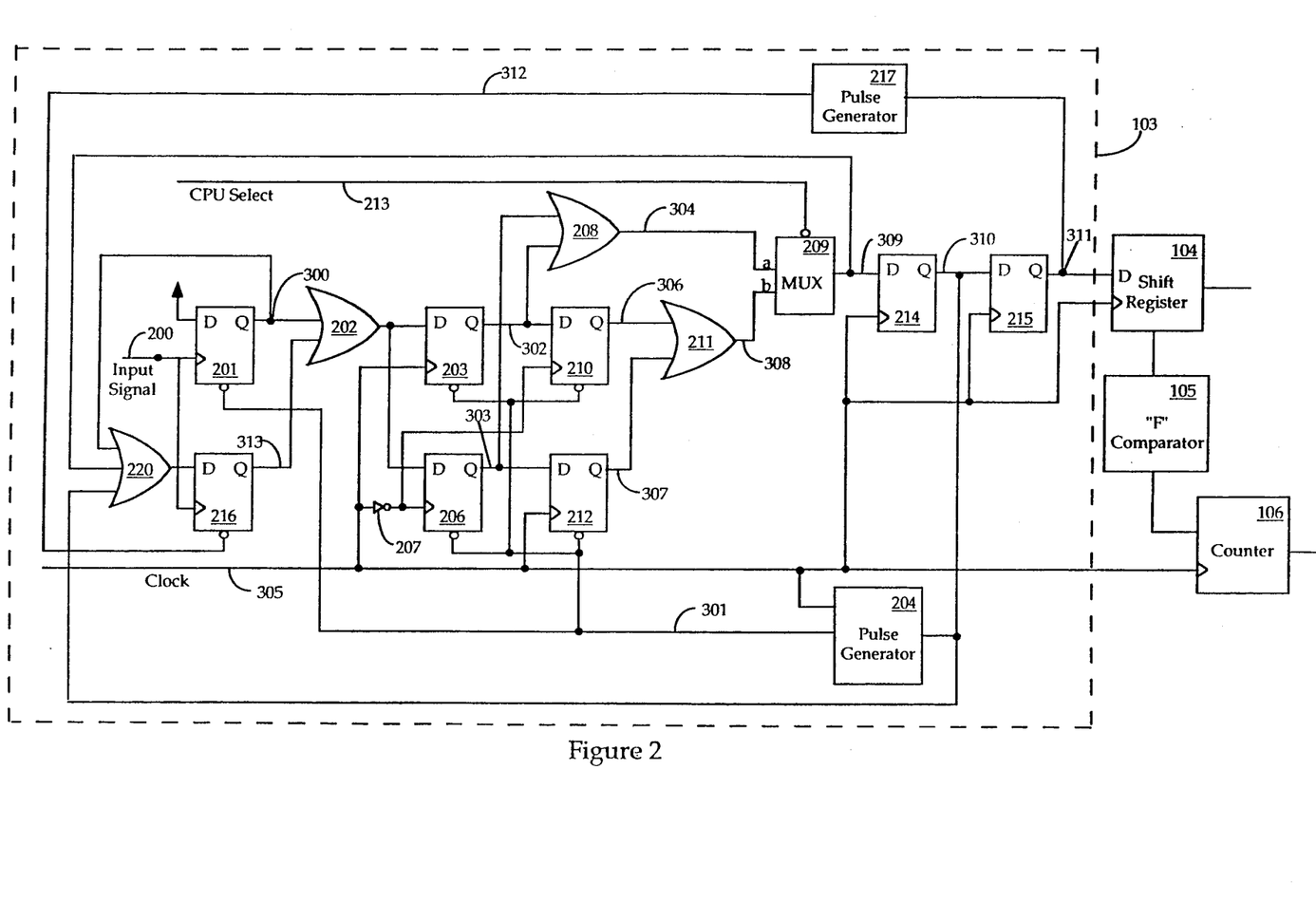
FIG. 2 is a circuit diagram illustrating the front-end detector for channel one.

FIG. 2 is a circuit diagram illustrating the front-end detector 103 for channel 101. The signal read from the optical disk is input to the front-end detector 103 through line 200. It is used to trigger flip-flop 201. The input of flip-flop 201 is tied "high" (i.e., +5 volts). The purpose of flip-flop 201 is to detect the first edge of an incoming pulse. The first pulse causes flip-flop 201 to output a "high" level to OR gate 202. The output 300 of flip-flop 201 remains "high" until reset by pulse generator 204. Thus, flip-flop 201 essentially extends the width of the incoming pulse for purposes of detection.

The output of OR gate 202 is input to flip-flops 203 and 206. Flip-flops 203 and 206 are implemented to determine which particular clock cycle the input pulse falls into. In other words, flip-flops 203 and 206 define the clock window for an input pulse.

Flip-flop 203 is triggered by a rising edge of the synthesized clock signal 305, which is typically generated by a crystal clock (not shown). Hence, flip-flop 203 is set "high" whenever the output of OR gate 202 is "high" and a clock pulse occurs. Specifically, this is initiated by the rising edge of the synthesized clock signal 305. Once flip-flop 203 is set "high," it remains "high" until reset by pulse generator 204.

Flip-flop 206 is triggered by the falling edge of the synthesized clock signal 305. This is accomplished by implementing an inverter 207. Hence, flip-flop 206 is set "high" whenever the output of OR gate 202 is "high" and synthesized clock signal 305 is "low." Specifically, this is initiated by the falling edge of the synthesized clock signal 305. Once flip-flop 206 is set "high," it remains "high" until reset by pulse generator 204.

The outputs 302 and 303 of flip-flops 203 and 206 are input to OR gate 208. Since flip-flops 203 and 206 are triggered by the positive and negative edges of the synthesized clock signal 305, respectively, the output 304 of OR gate 208 defines a clock window of one full clock cycle. With respect to a rising clock edge, an input pulse is detected $\frac{1}{2}$ clock cycle before and $\frac{1}{2}$ clock cycle after the rising clock edge, thereby resulting in a $\pm \frac{1}{2}$ clock cycle window. In other words, an input pulse can occur anytime within this clock window and still be considered to belong to the same bit position. The shift register 104 receives the detected input pulse, half a clock cycle after the window in which the pulse had occurred. The actual time for the detected input pulse to reach shift register 104 can be as great as 1.5 clock cycles.

The output of flip-flop 203 is also coupled to the input of flip-flop 210. Flip-flop 210 is triggered by a falling edge of clock signal 305. Flip-flop 210 is reset by a "low" output 301 from pulse generator 204. The output of flip-flop 210 is coupled to OR gate 211.

The output of flip-flop 206 is also coupled to the input of flip-flop 212. Flip-flop 212 is triggered by a rising edge of synthesized clock signal 305. Flip-flop 212 is reset by a "low" output 301 from pulse generator 204. The output of flip-flop 212 is coupled to OR gate 211.

Since flip-flops 210 and 212 are triggered by the negative and positive edges of synthesized clock signal 305, respectively, the output 308 of OR gate 211 defines a clock window of one full clock cycle. With respect to a rising clock edge, an input pulse is detected one full clock cycle after the rising clock edge. Hence, an input pulse can occur anytime within this clock window and still be considered to belong to the same bit position. This is similar to the clock window defined by flip-flops 203 and 206 except that, with the addition of flip-flops 210 and 212, the time that shift register 104 receives the detected input pulse is delayed by an additional half clock cycle. The input pulse is received one full clock cycle after the window containing the pulse. These two types of windows and their delays are more fully described below and shown in the timing diagram of FIG. 3.

The output 304 of OR gate 208 is coupled to multiplexor 209. Likewise, the output 308 of OR gate 211 is also coupled to multiplexor 209. Multiplexor 209 selects between these two outputs 304 and 308 based on the signal from CPU select line 213. This embodiment gives the CPU control over which of the two different types of windows is to be utilized.

The selected output 309 of multiplexor 209 is coupled to the input of flip-flop 214. Flip-flop 214 is triggered by a clock pulse on synthesized clock signal 305. The output 310 of flip-flop 214 is coupled to the input of pulse generator 204 and also to the input of flip-flop 215. Hence, the signal of output 309 is sent to flip-flop 215 during the next clock pulse of synthesized clock signal 305. In addition, if output 309 happens to be "high," the next clock pulse also triggers pulse generator 204.

The output 311 of flip-flop 215 is coupled to the input of shift register 104. Flip-flop 215 is triggered by a clock pulse on synthesized clock signal 305.

The output 311 of flip-flop 215 is also coupled to the input of pulse generator 217.

Front-end detector 103 also includes flip-flop 216. Flip-flop 216 is implemented to detect any input pulses which might occur during the time that flip-flop 201 is set "high." Whenever flip-flop 201 is set "high" (i.e., by an input pulse on signal 200), it takes approximately at least one and a half clock cycles for it to be reset. This is due to the fact that the input pulse must make its way through several flip-flops (e.g., flip-flops 203/206, 210/212, and 214) before a signal is sent to pulse generator 204 to generate a reset. During this reset time, a second input pulse might occur. Without flip-flop 216, the second input would not be detected because flip-flop 201 is still set "high." Thus, flip-flop 216 is implemented to detect a "11" input pulse sequence.

The input of flip-flop 216 is coupled to the output of OR gate 220, which has inputs coupled to the outputs of flip-flops 201 and 214 and multiplexer 209. Flip-flop 216 is triggered by an input pulse from input signal 200. The output 313 of flip-flop 216 is coupled to the input of OR gate 202. Flip-flop 216 is reset by the output 312 from pulse generator 217.

Additional circuitry is not required to detect the occurrence of any subsequent "1's" which might occur during the time that flip-flop 216 is set "high." When flip-flop 216 is "high," this indicates an input signal of "11." A "11" does not conform to the desired code "1000" to be detected. Consequently, the values of the two bits following the "11" signal are irrelevant because the "11" signal already signifies a non-conforming code.

Therefore, the output signal 311 from the front-end detector 103 represents the data read from the optical disk and which is also synchronized to the synthesized clock signal 305.

Figure 3:
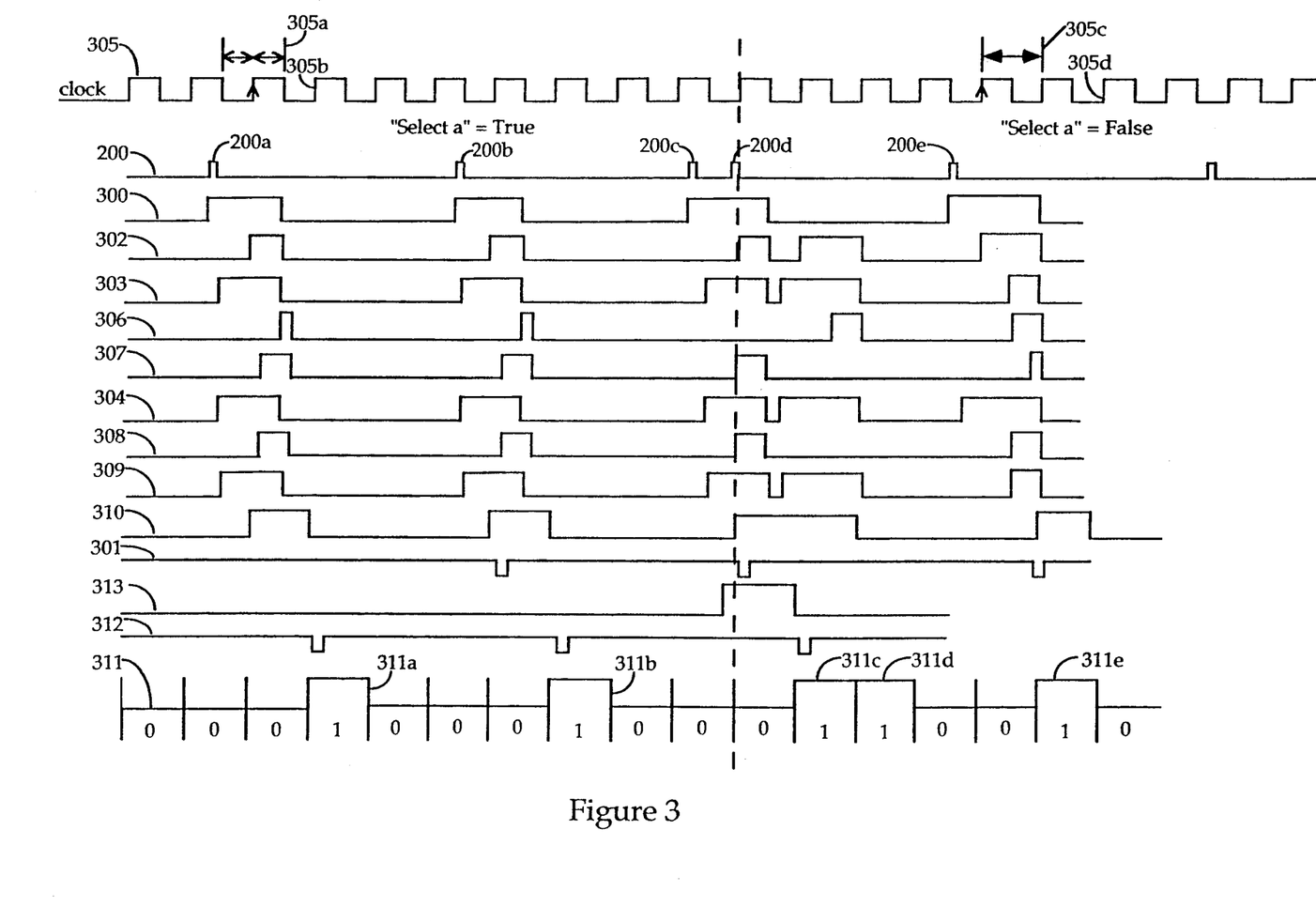
FIG. 3 is a timing diagram illustrating the signal levels at various points of the front-end detector for channel one.

FIG. 3 is a timing diagram illustrating the signal levels at various points of the front-end detector 103. A synthesized clock signal 305 is supplied to the front-end detector 103 by a crystal clock. Additionally, an input signal 200 representing a sample signal read directly from the optical disk is supplied to the front-end detector 103. The operation of the front-end detector 103 is based on these two signals.

FIG. 3 illustrates that the output 300 of flip-flop 201 is initially "low" and remains "low" until the occurrence of the first rising edge of an input pulse on input line 200, whereupon output 300 changes to a "high" state. Output 300 remains "high" until reset by a "low" state from the output 301 of pulse generator 204.

The output 302 of flip-flop 203 is "low" until the output of OR gate 202 is "high" and a clock pulse from synthesized clock signal 305 occurs. Whereupon, the output 302 of flip-flop 203 is set "high" until reset by a "low" from the output 301 of pulse generator 204.

The output 303 of flip-flop 206 is "low" until the output of OR gate 202 is "high" and synthesized clock signal 305 is "low." Whereupon, the output 303 is set "high" until reset by a "low" from the output 301 of pulse generator 204.

The output 304 of OR gate 208 is set "high" whenever either of outputs 302 or 303 are set "high."

The output 306 of flip-flop 210 is typically "low" unless the output 302 is "high" and synthesized clock signal 305 is "low." The falling edge of synthesized clock signal 305 initiates output 306 to be set "high."

Output 306 then remains "high" until reset by a "low" output 301.

The output 307 of flip-flop 212 is typically "low" unless the output 303 is "high" and synthesized clock signal 305 is also "high." The rising edge of synthesized clock signal 305 initiates output 307 to be set "high." Output 307 then remains "high" until reset by a "low" output 301.

The output 308 of OR gate 211 is "high" if either of the two output signals 306 or 307 is "high." Otherwise, output 308 is "low."

The output 309 from multiplexor 209 is either the same as output 304 or output 308, depending on the signal on CPU select line 213. In FIG. 3, the timing diagram is divided in half. The left half represents the situation wherein the CPU selects output 304. The right half represents the situation wherein the CPU selects output 308.

If output 304 were selected, the window is $\pm \frac{1}{2}$ clock cycle, as shown by 305a. An input pulse occurring anywhere within window 305b is detected and sent to shift register 104, which receives the input pulse half a clock cycle later, at 305b.

If output 308 were selected, the window is +1 clock cycle, as shown by 305c. An input pulse occurring anywhere within window 305c is detected and sent to shift register 104, which receives the input pulse one full clock cycle later, at 305d.

The output 310 from flip-flop 214, which is typically "low," is set "high" if output 309 is "high" and a clock pulse occurs.

The output 301 from pulse generator 204 is "high," except when output 310 becomes "high." Immediately after output 310 becomes "high," output 301 is set "low" for a short duration, in order to reset flip-flops 201, 203, 206, 210, and 212.

The output 311 from flip-flop 215, which is typically "low," is set "high" if output 310 is "high" and a clock pulse occurs. Output 311 is the output signal from the front-end detector 103 and is sent to the shift register 104. It can be seen from FIG. 3 that output 311 represents the input signal 200. Each input pulses 200a–e are detected by the front-end detector 103 and are represented by the "high" levels 311a–e, respectively. Thus, the output signal 311 of "00010001000110010" correctly represents the data that was read from the optical disk. In addition, output signal 311 is synchronized to the synthesized clock signal 305.

The output 312 from pulse generator 217 is "high," except when output 311 becomes "high." Immediately after output 311 becomes "high," output 312 is set "low" for a short duration, in order to reset flip-flop 216.

The output 313 of flip-flop 216 is "low" except when either output signals 300, 309, or 310 is "high" and an input pulse occurs on input signal 200, which sets output 313 "high."

Figure 4:
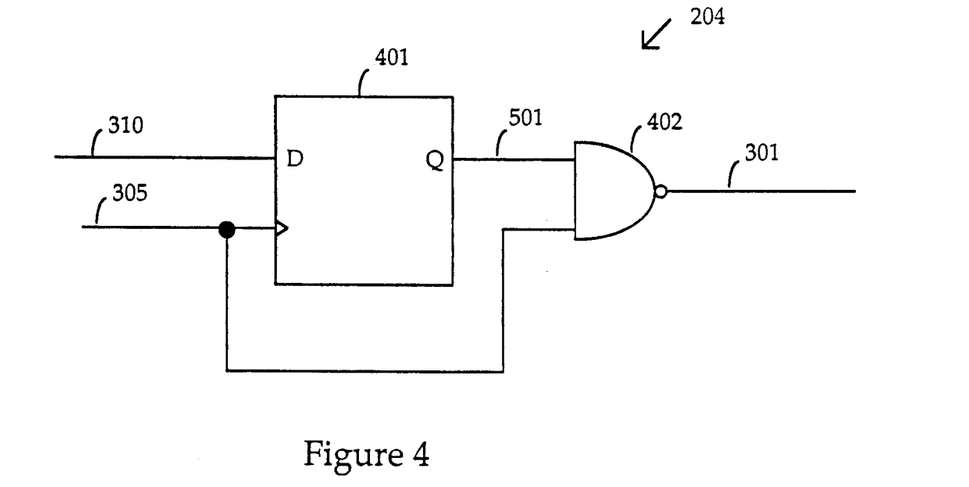
FIG. 4 is a circuit diagram of a pulse generator.

FIG. 4 is a circuit diagram of pulse generator 204. Output signal 310 from flip-flop 214 is input to flip-flop 401. A clock pulse from the synthesized clock signal 305 triggers flip-flop 401. The output 501 of flip-flop 401 is input to NAND gate 402. Synthesized clock signal 305 is also input to NAND gate 402. The output 301 of NAND gate 402 is coupled to the resets of flip-flops 201, 203, 206, 210 and 212.

Likewise, pulse generator 217 is also comprised of a flip-flop followed by a NAND gate.

Figure 5:
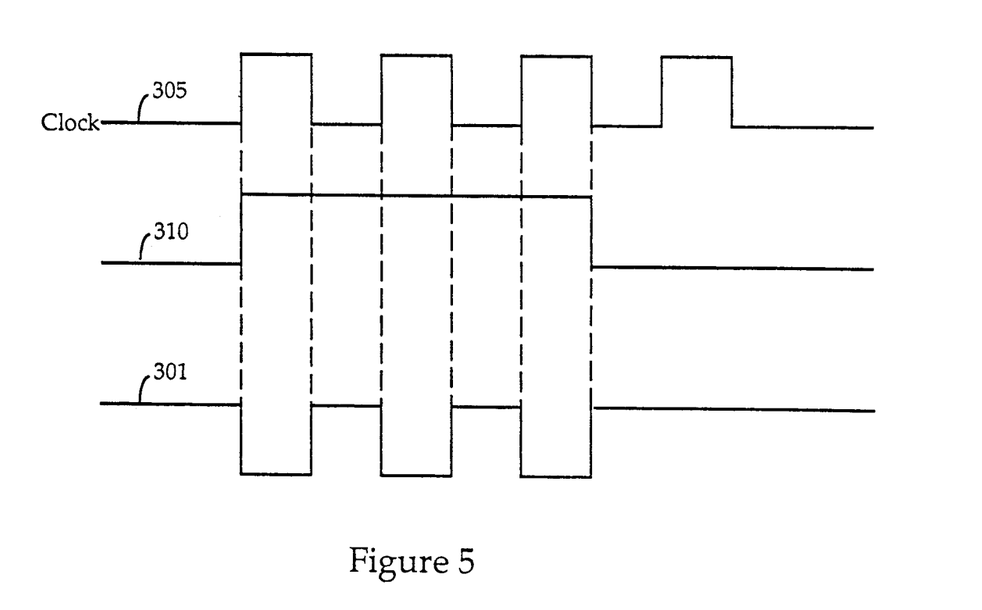
FIG. 5 is a timing diagram of the pulse generator.

FIG. 5 is a timing diagram for pulse generator 204. Given an input signal 310 and a clock signal 305 as a trigger, the output 301 of pulse generator 401 is shown.

The front-end detector 113 for the second channel 102 is the same as the front-end detector 103 for the first channel 101, as shown in FIG. 2, except for the ways in which flip-flops 203, 206, 210, and 212 are triggered. In the first channel 101, flip-flops 203 and 212 are triggered by "high" clock pulses from synthesized clock signal 305. Flip-flops 206 and 210 are triggered by "low" levels from synthesized clock signal 305, due to the insertion of inverter 207 which inverts the synthesized clock signal 305. For the second channel, inverter 207 is removed and replaced so that flip-flops 203 and 212 are triggered by "low" levels from synthesized clock signal 305, and flip-flops 206 and 210 are triggered by "high" clock pulses from synthesized clock signal 305.

In summary, flip-flop 201 detects the rising edge of an input pulse from data being read directly off the optical disk (i.e., from the DMP field). Flip-flops 203 and 206 define windows in reference to the synthesized clock signal 305. An input pulse falls into one of these windows as determined by the flip-flops 203 and 206. Flip-flops 210 and 212 define different windows in reference to the synthesized clock signal 305, in which an input pulse can occur. Multiplexor 209 chooses which of the two different windows is to be utilized. The detected pulse is passed to flip-flop 214 which instructs pulse generator 204 to generate a reset signal. The pulse is then passed to flip-flop 215 which instructs pulse generator 217 to reset flip-flop 216. Flip-flop 216 detects the occurrence of an input pulse if it happens to occur during the time that flip-flop 201 has already been set "high" (i.e., incapable of detecting a subsequent input pulse).

Thus, in reference to FIG. 3, input pulse 200a is detected and clocked in as a "1" as shown by pulse 311a (i.e., "high"). Next, since there is no transition (i.e., input pulse) for the following clock period, a zero (i.e., "low") is clocked in. Thereafter, two more zeros are clocked in for the next two clock periods. The occurrence of an input pulse 200b causes a "1" 311b to be clocked in, etc.

Shift registers 104 and 114 are each comprised of sixteen D flip-flops which serially shifts the bits detected by the front-end detectors to the "FF" comparators.

Figure 6:
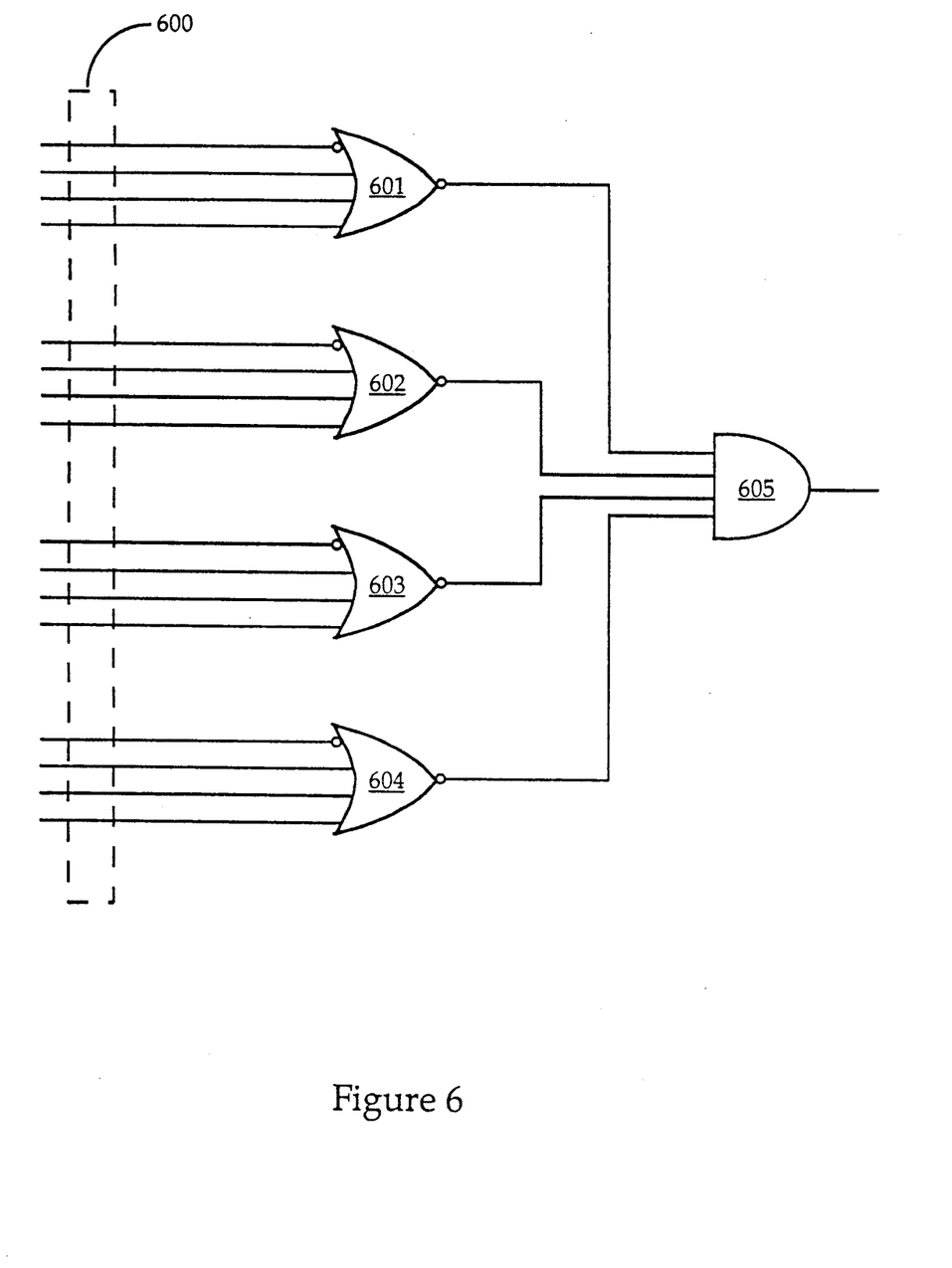
FIG. 6 shows a circuit diagram of an "FF" comparator.

FIG. 6 is a circuit diagram of an "FF" comparator. The sixteen bits 600 from the shift register (one bit from each of the sixteen flip-flops) are input to four NOR gates 601-604. Each NOR gate has four inputs, with the first input of each NOR gate being inverted. Hence, NOR gates 601-604 output a "high" only if the input is "1000." The outputs of NOR gates 601-604 are input to NAND gate 605. The output of NAND gate 605 is "high" only if the sixteen bits 600 being inputted are "1000100010001000."

Thus, an apparatus and method for detecting an "FF" code on an optical disk without utilizing a high frequency counter nor a phase-lock-loop, has been described.

What is claimed is:

1. An optical disk drive system having an optical disk for storing data and an apparatus for determining whether data read from a field within a sector of said optical disk corresponds to a code which specifies that said sector should not be erased, said apparatus including a clock means for generating a clock signal and a first read channel comprising:

a first means for generating a signal synchronized with said clock signal, said synchronized signal representing data read from said field;

a first means for serially shifting said synchronized signal to generate a shifted signal;

a first comparator means for comparing said shifted signal with said code;

a first counting means which increments each time said comparator detects a match between said shifted signal and said code;

a second comparator means for comparing the number stored in said counter with a pre-determined number, wherein if said counter number is greater than or equal to said pre-determined number said comparator generates a signal indicating that said sector contains data which should not be erased.

2. The apparatus of claim 1 further comprising a second read channel having an offset clock cycle as compared to said first read channel, wherein said second channel is comprised of a second generating means, a second serial shifting means, a third comparator means, a second counting means, and a fourth comparator means.

3. The apparatus of claim 2 wherein said first and said second generating means are each comprised of:

a first flip-flop for detecting a leading edge of a pulse of said data read from said field;

a second and a third flip-flop for determining a window in reference to said clock signal in which said pulse occurs; and a means for resetting said first, second, and third flip-flops.

4. The apparatus of claim 3 further comprises:

a third counting means coupled to said first channel and said second channel for counting a number of times said code is detected by either of said first channel and said second channel; and a fifth comparator means for comparing said number of said third counting means with a second pre-determined number, wherein if said number of said third counting means is equal to or exceeds said second pre-determined number, said fifth comparator means generates a signal indicating that said sector contains data which is not to be erased.

5. The apparatus of claim 4 wherein said first and said second generating means further comprises a fourth flip-flop for detecting an input pulse when said first flip-flop is set.

6. The apparatus of claim 5 further comprising a front-end detector having a fifth and a sixth flip-flop which shifts said window.

7. The apparatus of claim 6 wherein said code is comprised of a hexadecimal "FF" according to a 2,7 encoding scheme, wherein said "FF" corresponds to a binary number of 1000100010001000.

8. In an optical disk drive system having an optical disk comprised of a plurality of sectors for storing data, an apparatus for detecting the occurrence of a particular code when a particular field of one of said sectors of said optical disk is read, said code indicating that said sector contains data which a user desires to remain unaltered, said apparatus comprising:

a means for reading data from said field;

a clock for generating a clock signal;

a first read channel comprising:

a) a first front-end detector for determining the occurrence of input pulses read from said field in reference to said clock signal, wherein a signal representing said data read from said field is generated;

b) a first comparator for comparing said signal generated by said first front-end detector with said code which is fixed and indicating whether said signal generated by said first front-end detector is equivalent to said fixed code;

a second read channel having an offset clock cycle as compared to said first read channel comprising:

a) a second front-end for determining the occurrence of input pulses read from said field in reference to said clock signal, wherein a signal representing said data read from said field is generated;

b) a second comparator for comparing said signal generated by said second front-end with said code which is fixed and indicating whether said signal generated by said second front-end is equivalent to said fixed code;

a means for generating a signal indicating that said sector contains data which should not be altered, said signal being based on indications of said first and said second comparators.

9. The apparatus of claim 8 wherein said first and said second front-ends are comprised of:

a first flip-flop which is set by a leading edge of said input pulse read from said field;

a second and a third flip-flop coupled to said first flip-flop for determining a window in reference to said clock signal in which said pulse occurs;

a fourth flip-flop which accepts said input pulse and generates a reset signal;

a pulse generator which resets said first, second, and third flip-flops when said reset signal is received.

10. The apparatus of claim 9 wherein said first and said second front-ends are further comprised of a fifth flip-flop for detecting an input pulse when said first flip-flop is set.

11. The apparatus of claim 10 wherein said first and said second front-ends are each further comprised of a sixth and a seventh flip-flop for shifting said reference to said clock signal.

12. The apparatus of claim 11 wherein said code is comprised of a hexadecimal "FF" according to a 2,7 encoding scheme, wherein said "FF" corresponds to a binary number of 1000100010001000.

13. In an optical disk drive system including an optical disk having a sector for storing data, a method for determining whether said sector contains data which is not to be erased, comprising the steps of:

writing a code to a field corresponding to said sector, said code specifying that said sector is not to be erased;

generating a synthesized clock signal;

reading said field before said sector is to be erased;

generating a signal synchronized with said synthesized clock signal which represents data read from said field comprising the steps of:

detecting a leading edge of a first input pulse of said read data;

referencing said first input pulse to said synthesized clock signal;

generating a "high" output corresponding to said input pulse;

detecting a leading edge of a second input pulse of said read data;

referencing said second input pulse to said synthesized clock signal; and generating a "low" output for each of said synthesized clock signals which had occurred in between said first and said second input pulses;

shifting said signal synchronized with said synthesized clock signal to produce a shifted synchronized signal;

comparing said shifted synchronized signal with said code;

generating an indication that said sector contains data which is not to be erased if said synchronized signal matches said code.

14. The method of claim 13 further comprises the step of implementing a first channel for detecting said code and a second channel offset by approximately half a synthesized clock cycle for detecting said code.

15. The method of claim 14 wherein said code is comprised of a hexadecimal "FF" according to a 2,7 encoding scheme, wherein said "FF" corresponds to a binary number of 1000100010001000 read from said field.

* * * * *